(12) United States Patent
Liu et al.

(10) Patent No.: US 11,784,896 B2
(45) Date of Patent: Oct. 10, 2023

(54) NETWORK EQUIPMENT FOR MONITORING USER'S NETWORK ACTIVITY BEHAVIOR AND QUANTATIVE ANALYSIS AID AND GUIDANCE METHOD, AND TERMINAL DEVICE AND READABLE STORAGE MEDIUM THEREOF

(71) Applicant: D-LINK CORPORATION, Taipei (TW)

(72) Inventors: Ting-Wei Liu, Taipei (TW); Ching-Wen Lai, Taipei (TW)

(73) Assignee: D-Link Corporation, Taipei (TW)

( * ) Notice: Subject to any disclaimer, the term of this patent is extended or adjusted under 35 U.S.C. 154(b) by 0 days.

(21) Appl. No.: 17/672,034

(22) Filed: Feb. 15, 2022

(65) Prior Publication Data

US 2023/0239226 A1 Jul. 27, 2023

(30) Foreign Application Priority Data

Jan. 21, 2022 (TW) ................... 111102689

(51) Int. Cl.
*H04L 43/04* (2022.01)
*H04L 43/067* (2022.01)
*H04L 43/065* (2022.01)

(52) U.S. Cl.
CPC ............ *H04L 43/04* (2013.01); *H04L 43/065* (2013.01); *H04L 43/067* (2013.01)

(58) Field of Classification Search
CPC ..... H04L 43/04; H04L 43/065; H04L 43/067; H04L 43/0876; H04L 63/1425
See application file for complete search history.

(56) References Cited

U.S. PATENT DOCUMENTS

| | | | | |
|---|---|---|---|---|
| 7,808,916 B1* | 10/2010 | Futamura | ............ | H04L 63/1416 370/242 |
| 10,027,694 B1* | 7/2018 | Gupta | ................. | H04L 63/1458 |
| 2010/0046377 A1* | 2/2010 | Ryan | ................... | H04L 41/0681 370/241 |
| 2014/0075464 A1* | 3/2014 | McCrea | .................. | H04L 43/16 709/206 |
| 2014/0153396 A1* | 6/2014 | Gopalan | ............... | H04L 41/142 370/235 |

(Continued)

FOREIGN PATENT DOCUMENTS

CN 108965055 A 12/2018

*Primary Examiner* — Johnny B Aguiar
(74) *Attorney, Agent, or Firm* — Rosenberg, Klein & Lee (57) ABSTRACT

A network equipment monitoring analysis aid and guidance method, and its terminal device and readable storage medium are disclosed. The method is loaded into an equipment to execute the steps of collecting a history total traffic of a terminal device connected to the equipment; capturing a history time period traffic of each time period of the terminal device; analyzing the history total traffic and the history time period traffic by a quantitative analysis to generate a quantitative information of the terminal device; and presenting a corresponding guide information on a user interface according to the quantitative information. The guide information can be used to clearly mark a network traffic level of each terminal device in each time period and present it in a user interface, so as to visually present a network user's network activity behavior, guide parental use and monitoring, and set guidelines for members.

6 Claims, 9 Drawing Sheets

(56) References Cited

U.S. PATENT DOCUMENTS

2016/0261482 A1* 9/2016 Mixer ............... H04L 43/12
2019/0116131 A1* 4/2019 Patil ............... H04L 47/827
2020/0177485 A1* 6/2020 Shurtleff ............ H04L 67/12

* cited by examiner

Clients

| Play Station 5 | Snow's Mac | Frank's iPhone X |
|---|---|---|
| ▰▰▰▰ High Traffic-7Days | ▰▰▰▰ High Traffic-7Days | ▰▰▰▱ Medium Traffic-7Days |
| Unmanaged | Profile:Work Time<br>☾ Bedtime until Sat,8:00. | Profile:Kids' Profile<br>II Internet access paused until Tue,21:30. |

| Donkey's TV | Shrek's iPhone X | Frank's Pad |
|---|---|---|
| ▰▰▰▱ Medium Traffic-7Days | ▰▰▱▱ Low Traffic-7Days | ▰▰▱▱ Low Traffic-7Days |
| Profile:David Family<br>▶ Internet access allowed until Tue,21:30. | Profile:Kids' Profile<br>II Internet access paused until Tue,21:30. | Profile:David Family<br>▶ Internet access allowed until Tue,21:30. |

| Donkey's PC | Micky's iPhone |
|---|---|
| ▰▰▱▱ Low Traffic-7Days | ▰▰▱▱ Low Traffic-7Days |
| Profile:Kids' Profile<br>II Internet access paused until Tue,21:30. | Profile:Kids' Profile<br>II Internet access paused until Tue,21:30. |

| ✓ Traffic Usage |
|---|
| Profile |
| Client Name |

NETWORK EQUIPMENT FOR MONITORING USER'S NETWORK ACTIVITY BEHAVIOR AND QUANTATIVE ANALYSIS AID AND GUIDANCE METHOD, AND TERMINAL DEVICE AND READABLE STORAGE MEDIUM THEREOF

FIELD OF THE INVENTION

The present invention relates to a network equipment monitoring analysis aid and guidance method, and a terminal device and a readable storage medium using the method, and more particularly to a method that carries out a quantitative analysis of a history total traffic and a history time period traffic of a terminal device to facilitate presenting the quantitative information visually and setting and guiding related network monitoring.

BACKGROUND OF THE INVENTION

In recent years, it is inevitable for young children to have contacts with the Internet due to the popularization of various portable electronic devices and computers and the promotion of distance teaching. After the young children have contacted with the Internet, there is a risk for the children to connect to the Internet for a very long lime time and become addicted to the Internet due to their immature mental age. With the rise of Smart Home, gateway (which is a network device) has played an important role of the Internet in a smart home, and parents or guardians of the children usually act as system administrators to control the online activities of family members through the gateway, so as to effectively avoid the aforementioned addiction problem.

At present, some network equipment, gateways, and electronic devices have already provide a parental control function, and a profile of members for parental control is drafted according to a guideline, such that parents or guardians can control a user allowable connection time through a schedule control mechanism, set guidelines to disconnect the Internet at bedtime or allow Internet connection in restricted periods only, and use a website filter and a night usage report to assist family members to use the Internet correctly in the role of parents or guardians. However, parents or guardians usually explore and learn the operation of this function on their own, and the level of technical difficulty of this function is relatively high, so that the popularity of this function is relatively low. On the other hand, the setting of this function is also lack of objective reference data and friendly guidance methods, so that it is one of the reasons for the low popularity of this function.

In view of the aforementioned drawbacks of the prior art, the inventor of the present invention based on years of experience in the related industry to conduct extensive research and experiment on the traffic analysis and the setting of guidelines for network equipment, and finally provided a network equipment monitoring analysis aid and guidance method in accordance with the present invention to overcome the drawbacks of the prior art.

SUMMARY OF THE INVENTION

To overcome the aforementioned problems and achieve the aforementioned objectives, the present invention discloses a network equipment monitoring analysis aid and guidance method loaded into an equipment to execute the following steps, and the steps include: collecting a history total traffic of at least one terminal device connected to the equipment; capturing a history time period traffic at each time period of the terminal device; analyzing the history total traffic and the history time period by a quantitative analysis to generate at least one quantitative information of at least one of the terminal devices; and presenting at least one corresponding guide information on a user interface according to the quantitative information.

The present invention also discloses a terminal device including: a processor; and at least one storage device, for storing an instruction which is executed by the processor to realize the aforementioned network equipment monitoring analysis aid and guidance method.

The present invention further discloses a terminal device, including: a data collection module, connected to at least one terminal device, and provided for collecting a history total traffic and a history time period traffic of the terminal device; a quantitative analysis module, connected to the data collection module, and provided for performing a quantitative analysis of the history total traffic and the history time period to generate at least one quantitative information of at least one of the terminal devices; a data presentation module, connected to the quantitative analysis module, and provided for presenting the quantitative information of the corresponding terminal device; a push module, connected to the quantitative analysis module, and provided for defining at least one trigger event corresponding to the quantitative information, and monitoring a current traffic of the terminal device, and generating a corresponding push message when the current traffic triggers the trigger event; and a guide module, connected to the quantitative analysis module and the data presentation module, for generating at least one guide information according to the quantitative information.

From the description above, the present invention has the following advantages and effects:

1. The present invention uses the quantitative analysis of the history total traffic and the history time period traffic to obtain the quantitative information and generate the corresponding guide information, and present the guide information at a user interface, so as to facilitate presenting the network user's network activity behavior visually and executing the collection, organization, statistical analysis, integration procedure of the Internet traffic, so as to guide parents or guardians to use, monitor, and objectively and accurately set the guideline of its members according to the device and time period, and effectively control the network activity of network members. Therefore, the network administrator can permit, prohibit or restrict the Internet access of the network users or terminal devices within any time period.

2. The present invention can further set a trigger event to automatically monitor the current traffic of the terminal device. When the current traffic triggers the trigger event, a push message will be generated actively and transmitted to the device set by the user, so that a network administrator can observe or understand the normal/abnormal traffic within the collected time period in order to effectively monitor the network activity and traffic.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
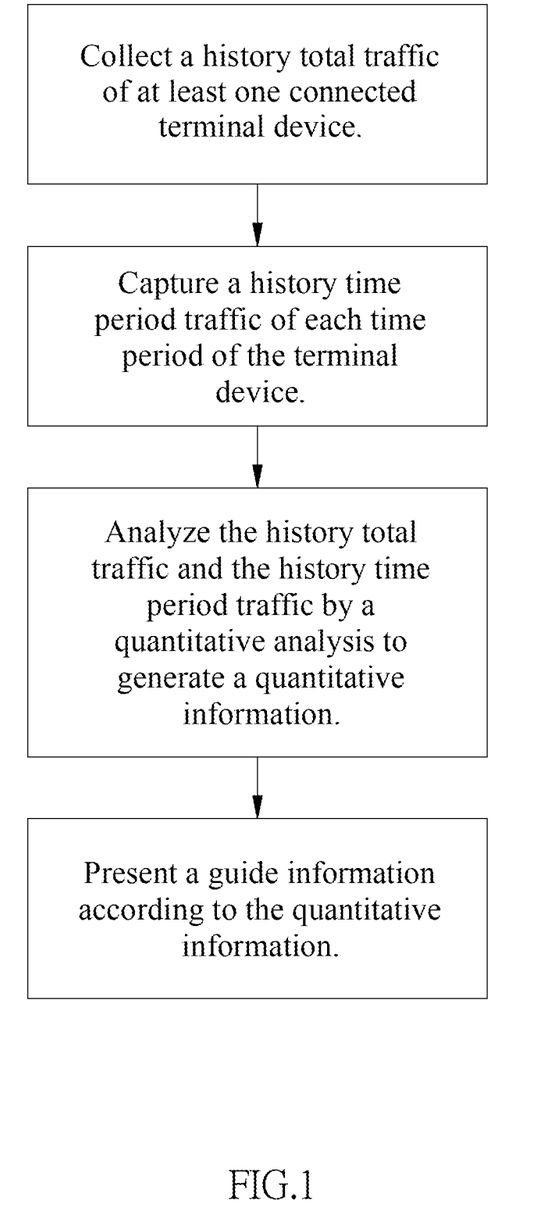
FIG. 1 is a flow chart of the present invention.
Figure 2:
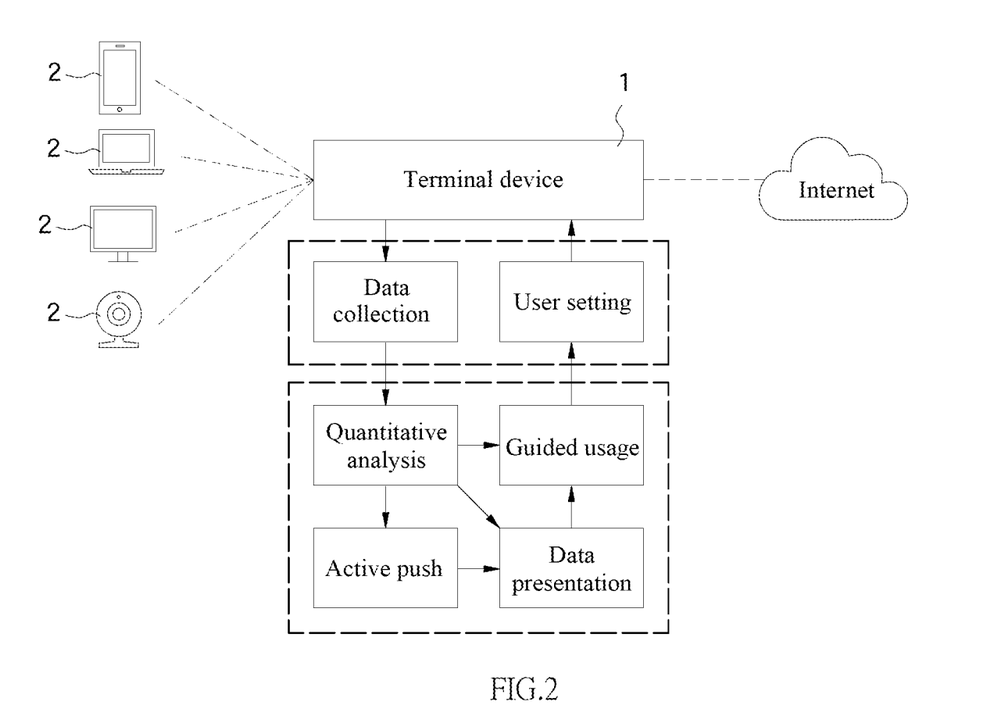
FIG. 2 is a block diagram showing the units of an analysis and guidance method in accordance with the present invention.

With reference to FIG. 1 for a network equipment monitoring analysis aid and guidance method of the present invention, the method is loaded into a network equipment to execute the following steps, and the network equipment of the present invention is a terminal device 1, and the terminal device 1 includes a processor and at least one storage device, and the storage device is provided for storing an instruction, which is executed by the processor to carry out the steps, or a readable storage medium is provided for storing at least one instruction, which is executed by the equipment to carry out the steps. Therefore, the equipment can be a computer or a wireless base station such as a routing device, a wireless control unit or a wireless extender, and these examples are used for illustrating the present invention only, but not intended for limiting the scope of the invention. The method of the present invention as shown in FIGS. 1 and 2 includes the following steps:

Collect a history total traffic of at least one terminal device 2 connected to the terminal device 1; capture a history time period traffic at each time period of the terminal device 2; and perform a quantitative analysis of the history total traffic and the history time period to generate at least one quantitative information of at least one of the terminal devices 2.

The present invention uses the quantitative analysis as described above to collect the past traffic data at all time periods of connecting to the terminal device 2 and delete the invalid data, and then uses the quantitative method to convert data into information; wherein, the quantitative method can adopt a Gaussian operation. However, this is just an example provided for illustrating the present invention only, but not intended for limiting the scope of the invention. In other embodiments, other quantitative method can also be used to quantify the data. In this embodiment, the Gaussian distribution method is primarily used to calculate the history total traffic.

Firstly, the arithmetic mean $\mu_D$ of the history total traffic of all terminal devices 2 is calculated by the mathematical formula 1 as given below:

$$\mu_D = \frac{1}{H}D = \frac{1}{H}\sum_{h=1}^{H}d_h = \frac{1}{H}\sum_{h=1}^{H}\sum_{n=1}^{N}d_{h,n}$$ [Mathematical formula 1]

where, $d_{h,n}$ is the history traffic of the $h^{th}$ terminal device 2 within the $n^{th}$ sample time period (such as unit hour); $d_h$ is for the total history traffic of one of the terminal devices 2; N is the total of all sample time periods of one of the terminal devices 1; H is the total number of terminal devices 2; and D is the total history traffic of all terminal devices 2.

Next, the population standard deviation or the sample standard deviation of the history total traffic of the terminal device 2 can be calculated. The population standard deviation $\sigma_D$ is calculated by the mathematical formula 2 as given below:

$$\sigma_D = \sqrt{\frac{1}{H}\sum_{h=1}^{H}(d_h - \mu_D)^2}$$ [Mathematical formula 2]

Next, the standard score $Z_h$ of each terminal device 2 is calculated by the mathematical formula 3 as given below:

$$Z_h = \frac{d_h - \mu_D}{\sigma_D}$$ [Mathematical formula 3]

Figure 3:
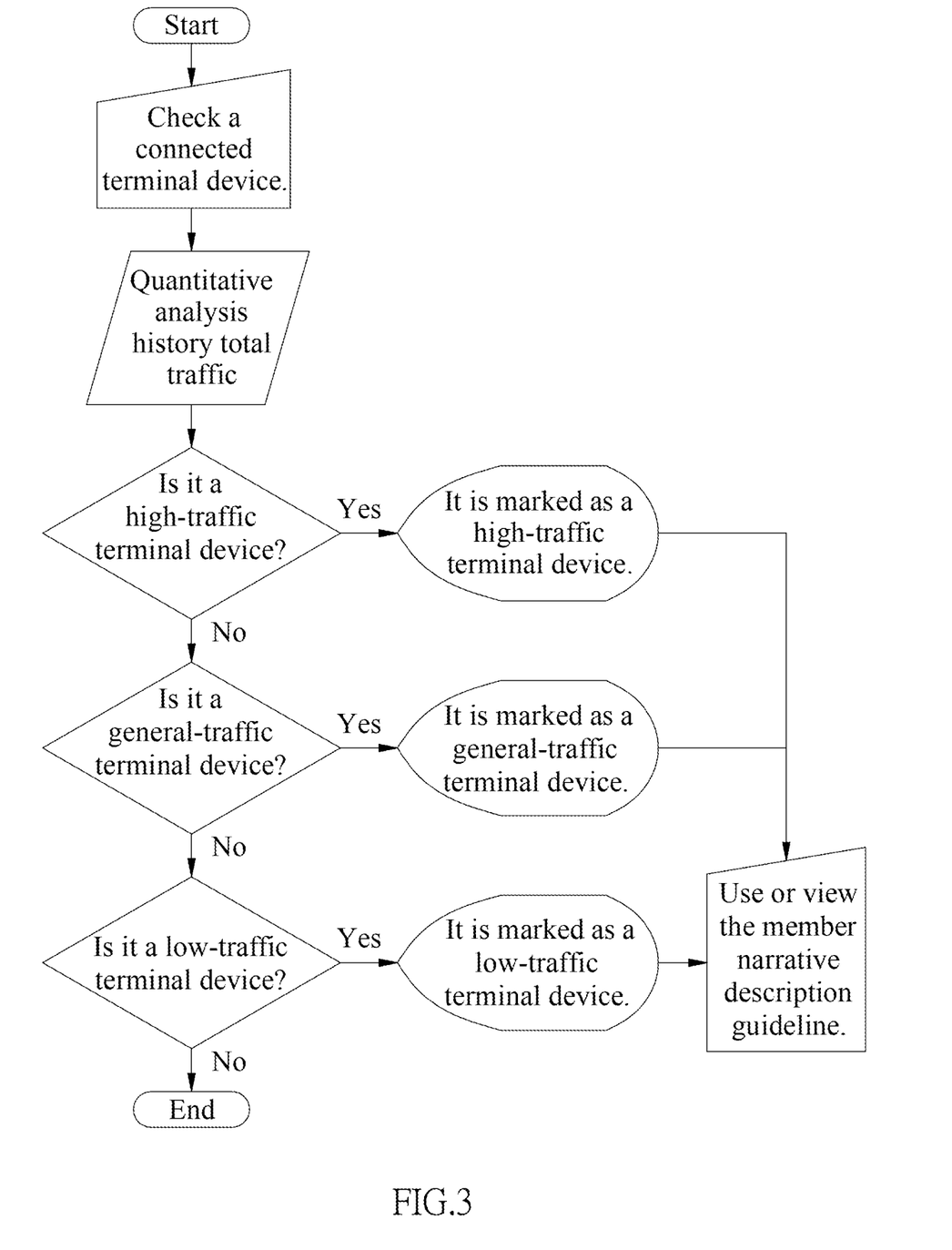
FIG. 3 is a flow chart of a quantitative analysis of a history total traffic in accordance with the present invention.
Figure 4:
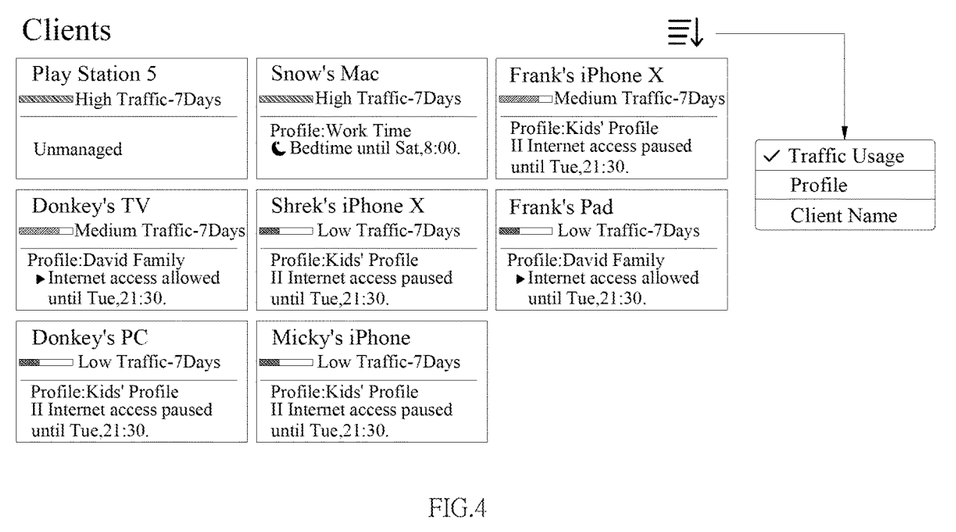
FIG. 4 is a schematic view showing a status of the traffic of a terminal device presented at a user interface in accordance with the present invention.

The quantitative information can be the aforementioned standard score, or the result obtained by data analysis based on the standard score. In an embodiment, the history total traffic of all terminal devices 2 can be divided into different levels such as high traffic, general traffic and low traffic to facilitate the graphic marking. In a preferred embodiment, the quantitative information is the level marking, that is, if the standard score $Z_h<-1$, the level will be marked as low traffic; if $-1\leq Z_h<1$ then the level will be marked as general traffic; and if $Z_h\geq 1$, then the level will be marked as high traffic, and the filter comparison value will be 1 and −1, representing a positive standard deviation and a negative standard deviation respectively, and the practical application scenarios between terminal devices can be dynamically adjusted, and its determination process is shown in FIG. 3, and the quantitative information can be checked and view at a user interface as shown in FIG. 4. In an embodiment, information including the member narrative guideline, history total traffic, remark or related description are presented in the visualization block of each member (such as the terminal device 2) and provided for intuitive lookup, and can be arranged according to the quantitative information of the level, the history total traffic, the member name, or the name of the member narrative description guideline of in an ascending order or a descending order to facilitate users' review, and each graphical block can be clicked to directly set Or use a member narrative description guideline; but such arrangement is just an example used for illustrating the present invention only, and not intended for limiting the scope of the invention.

Figure 5:
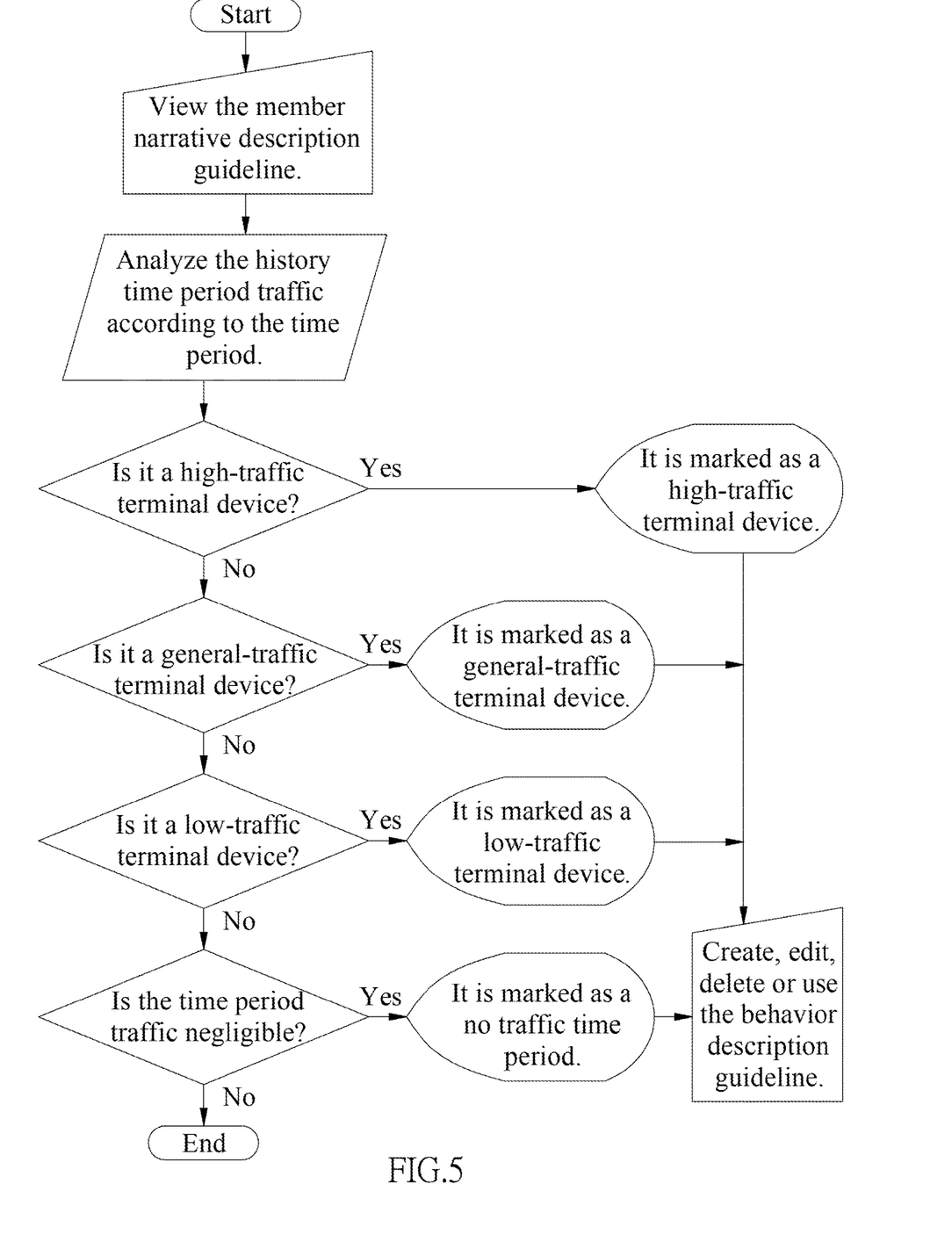
FIG. 5 is a flow chart of a quantitative analysis of a history time period traffic in accordance with the present invention.

In an embodiment as shown in FIG. 5, invalid data can be deleted as described in the aforementioned quantitative analysis of the history time period traffic, and data can be converted into information according to quantified member narrative description guideline, and the data presentation allows us to understand whether or not there is any abnormality or unexpected traffic in the time period, and the quantitative analysis can also be achieved by the Gaussian operation. However, this arrangement is only provided for the purpose of illustration of the present invention only, but not intended for limiting the scope of the invention. In this embodiment, the network usage and corresponding level of a single terminal device 2 within each time period of several days can be quantified to facilitate visualization, let users check the history quantitative data easily and control the permission or prohibition of the Internet access time period; and the calculations are described below:

Firstly, the arithmetic mean $\mu_h$, of the history time period traffic of a specific terminal device 2 ($h$) in N sample time (such as a week) is calculated by the mathematical formula 4 as given below:

$$\mu_h = \frac{1}{N}\sum_{n=1}^{N} d_{h,n} \qquad \text{[Matnematical formula 4]}$$

where, $d_{h,n}$ is the history time period traffic of the $h^{th}$ terminal device 2 in the $n^{th}$ sample time period (such as an hour).

Then, a population standard deviation or a sample standard deviation of the terminal device 2 within the sample time period is calculated. The population standard deviation $\sigma_h$ can be calculated by the mathematical formula 5 as given below:

$$\sigma_h = \sqrt{\frac{1}{N}\sum_{n=1}^{N}(d_{h,n} - \mu_h)^2} \qquad \text{[Mathematical formula 5]}$$

The standard score $Z_{h,n}$ in each sample time is calculated by the mathematical formula 6 as given below:

$$Z_{h,n} = \frac{d_{h,n} - \mu_h}{\sigma_h} \qquad \text{[Mathematical formula 6]}$$

The quantitative information can be the aforementioned standard score of the history time period traffic, or a data analysis result. In a preferred embodiment, a bias between the standard score in a sample time and the standard score of the terminal device 2 is calculated by the mathematical formula 7 as given below:

$$Z_{Bias,h,n} = Z_{h,n} + Z_h \qquad \text{[Mathematical formula 7]}$$

The biased standard score $Z_{Bias,h,n}$ can be converted into a sten score, and the traffic level of each terminal device 2 in each time period is marked with a level of the sten score and can be divided into different history traffic levels such as high traffic, general traffic, low traffic, and no traffic. In an embodiment, the quantitative information is defined as the time period interval of no/negligible traffic when $Z_{Bias,h,n} < 2$, the time period interval of low traffic when $2 \leq Z_{Bias,h,n} < 4$, the interval period time of general traffic when $4 \leq Z_{Bias,h,n} < 8$, and the history traffic interval of high traffic when $Z_{Bias,h,n} \geq 8$, and the aforementioned filter comparison values 2, 4 and 8 represent the level comparison values of the sten scores, which can be used to dynamically adjust the practical application scenarios between terminal devices.

Figure 6:
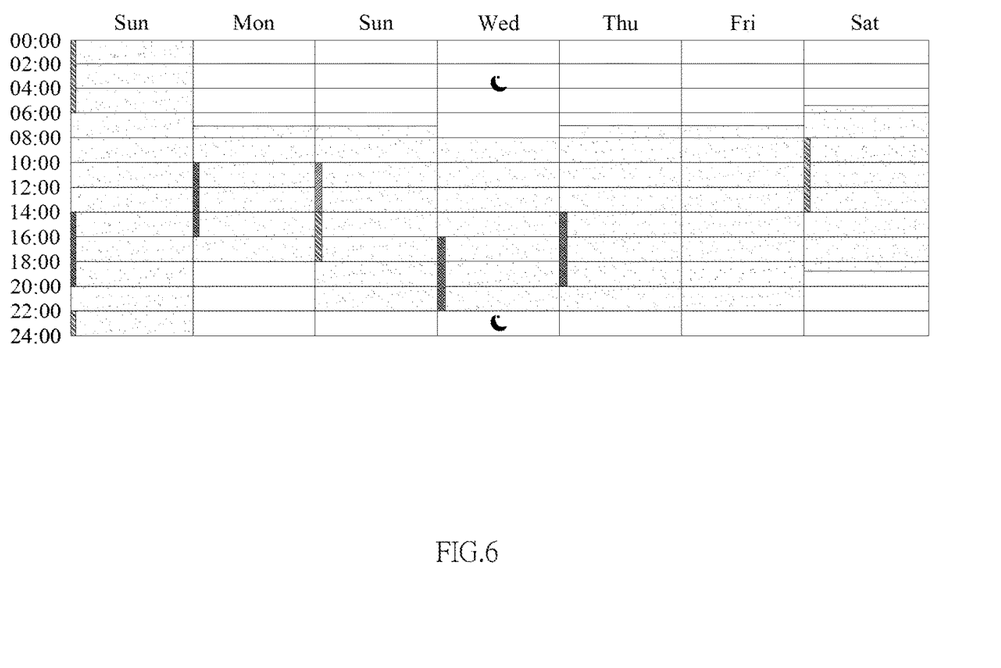
FIG. 6 is a schematic view showing a status of guide information presented at a user interface in accordance with the present invention.

The quantitative information obtained from the quantitative analysis is presented as shown in FIG. 6, wherein at least one guide information is presented at a user interface, and the guide information can be a chart presentation or a graphical presentation. In this embodiment, a chart is used to show a weekly history traffic situation of an equipment, wherein the dark color represents the high traffic, the second dark color represents a general traffic, and the light color represents a low traffic, and no color represents no or negligible traffic of an equipment in a time period interval, which are used to guide the marking and allow user to visually present a network user's network activity behavior, guide parental use and monitoring, and directly click from the interface to create, edit, or delete a member narrative description guideline, objectively and accurately set the guideline of its members according to the device and time period, and effectively control the network activity of network members, such as editing the Internet access time period, prohibiting the Internet access time period, and starting a slow Internet access time period. Therefore, the network administrator can permit, prohibit or restrict the Internet access of the network users or terminal devices 2 within any time period.

Figure 7:
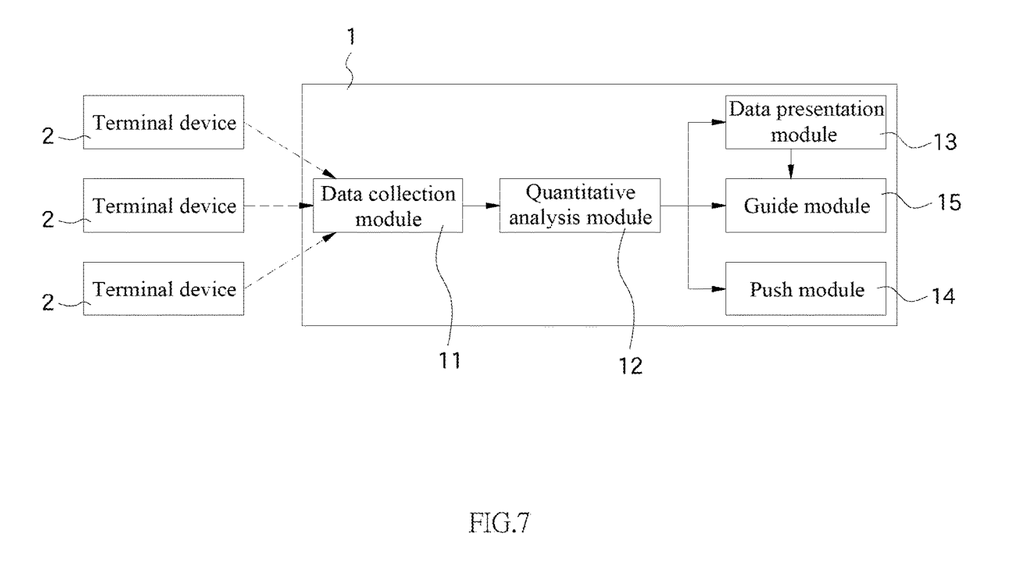
FIG. 7 is a block diagram showing the functional modules of the present invention.

With reference to FIG. 7 for the block diagram of the functional modules of the equipment of the present invention, these functional modules are used to carry out the functions and steps of the present invention, and the terminal device 1 includes:

a data collection module 11 connected to at least one terminal device 2. The data collection module 11 is configured for collecting a history total traffic and a history time period traffic of the terminal device 2;

a quantitative analysis module 12 connected to the data collection module 11. The quantitative analysis module 12 is configured for performing a quantitative analysis of the history total traffic and the history time period traffic to generate at least one quantitative information of at least one of the terminal devices 2;

a data presentation module 13 connected to the quantitative analysis module 12, and provided configured for presenting the quantitative information of the corresponding terminal device 2;

a push module 14 connected to the quantitative analysis module 12. The push module 14 is configured for defining at least one trigger event corresponding to the quantitative information, monitoring a current traffic of the terminal device 2, and generating a push message when the current traffic triggers the trigger event; and a guide module 15 connected to the quantitative analysis module 12 and the data presentation module 13. The guide module 15 is configured for generating at least one guide information according to the quantitative information.

Figure 8:
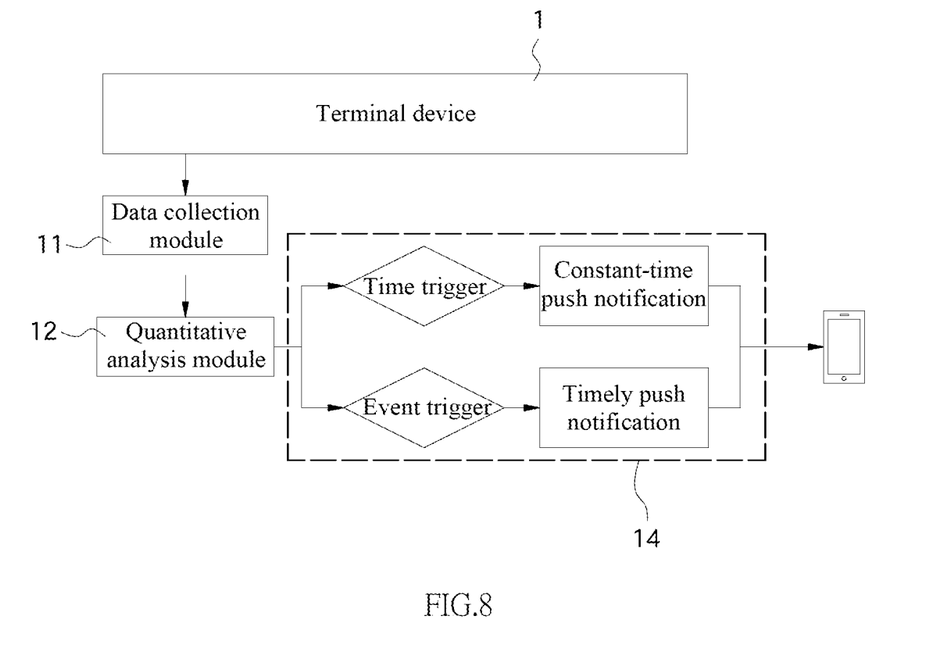
FIG. 8 is a flow chart of executing a push notification by a push module in accordance with the present invention.

In this way, the present invention can use the aforementioned functional modules to execute the procedure of the present invention. In FIG. 8, the present invention further defines at least one trigger event corresponding to the quantitative information in the push module 14 of the terminal device 1, wherein the trigger event can be a specific event (such as a traffic or abnormal connection) or a time event set according to the requirements and the equipment is enabled to actively monitor the current traffic of the terminal device 2 and trigger the current traffic according to the time trigger or event trigger, so as to generate a push message accordingly, and actively report it to a smartphone, a mobile phone, a computer or a table PC set by the parents or guardians in real time, or set to actively report traffic events or suddenly occurring traffic event weekly according to actual requirements, and use them as history information for reference.

Figure 9:
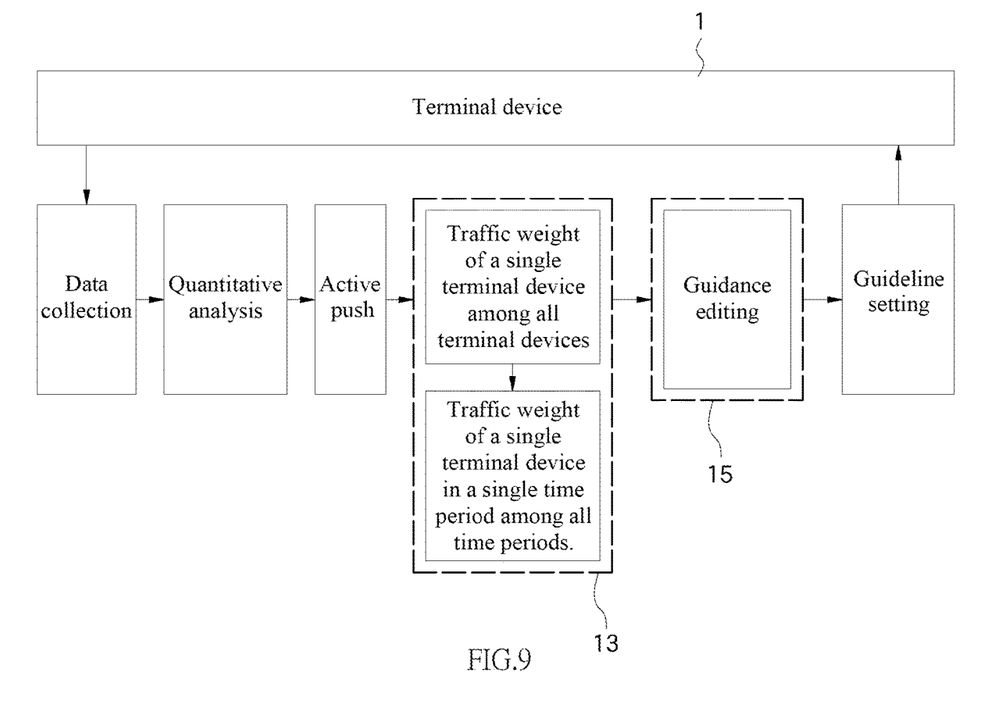
FIG. 9 is a flow chart of setting the data presentation, and presenting the guide information and setting the guidelines in accordance with the present invention.

In FIGS. 6 and 9, the present invention presents the guide information in the user interface through the data presentation module 13, and the information is presented directly in the chart and provided for editing the trigger event or related guidelines. In an embodiment, the traffic weights of all terminal devices 2 are compared with the traffic weight of all time periods in another window and marked by the guide information of the guide module 15 to further guide the parents or guardians to set or edit the trigger event or related guidelines for the first or next time.

The history record data presentation and the member narrative description guideline of each terminal device 2 in several time periods can be set, and the user interface allows the network administrator to create, delete, and update the member narrative description guideline, and further allows the network administrator to create the network usage schedule of a network equipment in the network and the member narrative description guideline, and the website filter function, edit the Internet access time period, set the prohibition of nighttime Internet access time period and the time period for prohibiting the Internet access, or turning on a slow Internet access function, and all these examples are used for the purpose of illustrating the present invention only, but not intended for limiting the scope of the invention.

While we have shown and described embodiment of the present invention, it should be clear to those skilled in the art that further embodiments may be made without departing from the scope of the present invention.

What is claimed is:

1. A method of equipment monitoring analysis aid and guidance, comprising the steps of:
    collecting a history total traffic of at least one terminal device connected to the equipment;
    capturing a history time period traffic of each time period of the at least one terminal device;
    analyzing the history total traffic and the history time period traffic by a quantitative analysis to generate at least one quantitative information of the at least one terminal device, the quantitative analysis including:
        calculating a standard deviation of a traffic selected from a group consisting of the history total traffic and the history time period traffic in the at least one terminal device,
        calculating a standard score of the at least one terminal device according to the standard deviation, and
        generating the at least one quantitative information of the at least one terminal device by the quantitative analysis according to the standard score of the traffic selected from a group consisting of the history total traffic and the history time period traffic;
    calculating the standard score of the history time period traffic according to the standard deviation of the history time period traffic;
    calculating a bias of the standard score of the history time period traffic according to the standard score of the at least one terminal device;
    defining a history traffic level according to the biased standard score; and generating the at least one quantitative information of the at least one terminal device according to the history traffic level;
    generating at least one guide information according to the at least one quantitative information computed based on the standard score of the at least one terminal device;
    presenting the at least one guide information on a user interface; and
    controlling an access of the at least one terminal device to the equipment based on the at least one guide information.

2. The method according to claim 1, further comprising the steps of:
    defining at least one trigger event corresponding to the at least one quantitative information;
    monitoring a current traffic of the at least one terminal device; and
    generating a push message, when the current traffic triggers the at least one trigger event.

3. The method according to claim 1, further comprising the steps of:
    presenting the at least one quantitative information on the user interface.

4. The method according to claim 1, further comprising the steps of:
    configuring the at least one terminal device with a processor and at least one storage device, and configuring the at least one storage device for storing an instruction executed by the processor.

5. A terminal equipment comprising a processor and a memory, the memory storing instructions to execute a plurality of modules, the plurality of modules including:
    a data collection module coupled to at least one terminal device, the data collection module being configured for collecting a history total traffic and a history time period traffic of the at least one terminal device;
    a quantitative analysis module coupled to the data collection module, the quantitative analysis module being configured for performing a quantitative analysis of the history total traffic and the history time period traffic to generate at least one quantitative information of the at least one terminal device based on calculating a standard deviation of a traffic selected from a group consisting of the history total traffic and the history time period traffic in the at least one terminal device, and calculating a standard score of the at least one terminal device according to the standard deviation the quantitative analysis module being further configured for:
        calculating the standard score of the history time period traffic according to the standard deviation of the history time period traffic;
        calculating a bias of the standard score of the history time period traffic according to the standard score of the at least one terminal device; and
        defining a history traffic level according to the biased standard score; and generating the at least one quantitative information of the at least one terminal device according to the history traffic level;
    a data presentation module coupled to the quantitative analysis module, the data presentation module being configured for presenting the at least one quantitative information of the at least one terminal device;
    a push module coupled to the quantitative analysis module, the push module being configured for defining at least one trigger event corresponding to the at least one quantitative information, for monitoring a current traffic of the at least one terminal device, and for generating a corresponding push message when the current traffic triggers the at least one trigger event; and
    a guide module coupled to the quantitative analysis module and the data presentation module, the guide module being configured for generating at least one guide information according to the at least one quantitative information computed based on calculating a standard deviation of a traffic selected from a group consisting of the history total traffic and the history time period traffic in the at least one terminal device, and calculating a standard score of the at least one terminal device according to the standard deviation, wherein an access of the at least one terminal device to the equipment is controlled based on the at least one guide information.

6. A non-transitory computer readable storage medium for storing at least one instruction executed by a processor, the non-transitory computer readable storage medium being configured for realizing network equipment monitoring analysis aid and guidance, when the at least one instruction is executed by the processor, by:

collecting a history total traffic of at least one terminal device connected to an equipment;

capturing a history time period traffic of each time period of the at least one terminal device;

analyzing the history total traffic and the history time period traffic by a quantitative analysis to generate at least one quantitative information of the at least one terminal device, the quantitative analysis including:

calculating a standard deviation of a traffic selected from a group consisting of the history total traffic and the history time period traffic in the at least one terminal device, calculating a standard score of the at least one terminal device according to the standard deviation, calculating the standard score of the history time period traffic according to the standard deviation of the history time period traffic;

calculating a bias of the standard score of the history time period traffic according to the standard score of the at least one terminal device;

defining a history traffic level according to the biased standard score; generating the at least one quantitative information of the at least one terminal device according to the history traffic level; and generating the at least one quantitative information of the at least one terminal device by the quantitative analysis according to the standard score of the traffic selected from a group consisting of the history total traffic and the history time period traffic;

generating at least one guide information according to the at least one quantitative information computed based on the standard score of the at least one terminal device; and presenting the at least one guide information on a user interface; and controlling an access of the at least one terminal device to the equipment based on the at least one guide information.

* * * * *